Patented Jan. 14, 1941

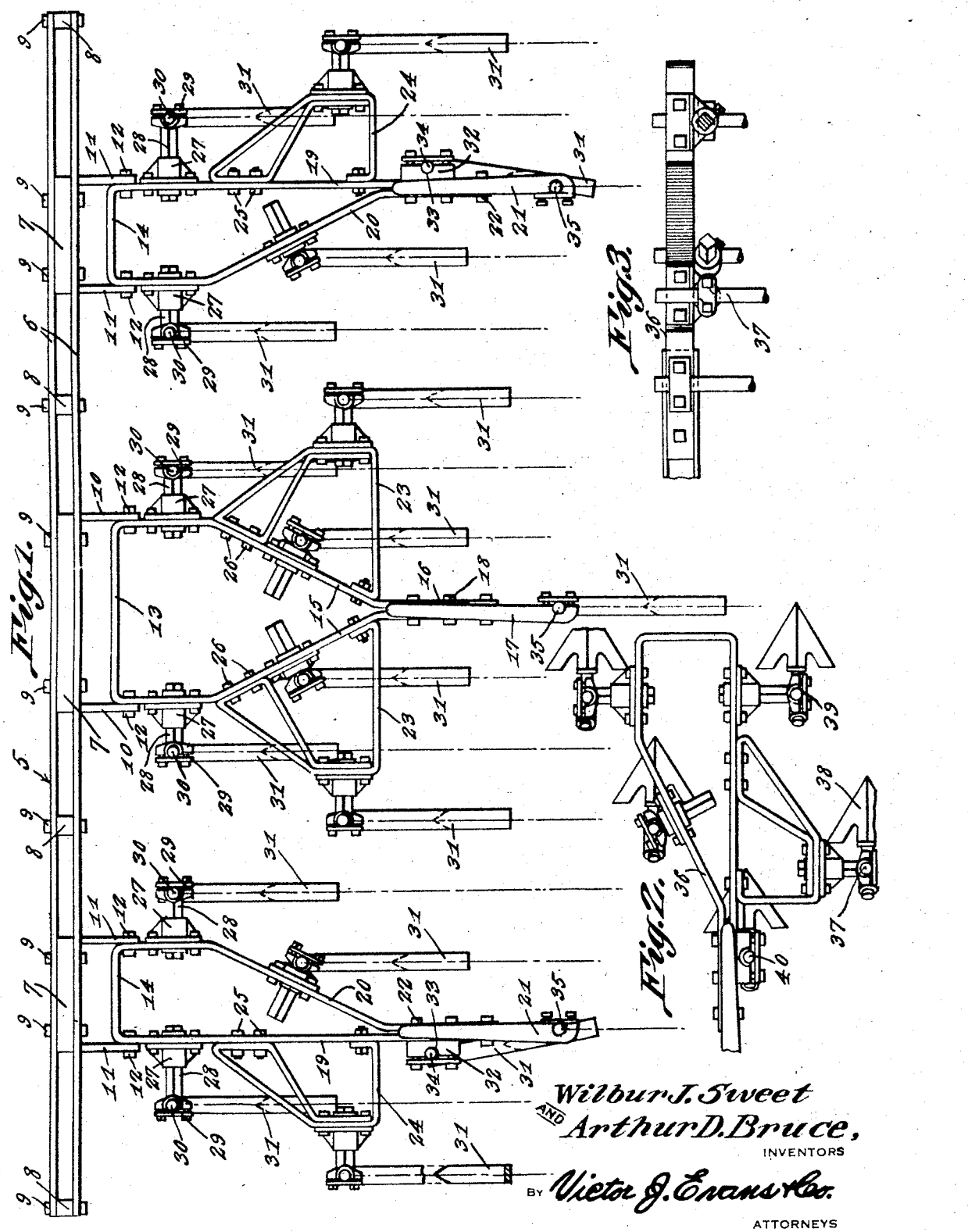

2,228,420

UNITED STATES PATENT OFFICE 2,228,420

AGRICULTURAL IMPLEMENT

Wilbur Jay Sweet and Arthur D. Bruce, Aurelia, Iowa

Application August 29, 1939, Serial No. 292,474

1 Claim. (Cl. 97—152)

The invention relates to an agricultural implement or machine and more especially to a convertible row crop cultivator.

The primary object of the invention is the provision of an implement of this character wherein a cultivator using a spring toothed shovel sweep or other ground working implements can be converted into a spring toothed harrow or field cultivator for the purpose of preparing soil and destroying weeds, the implement or machine being readily converted so that it may operate for the purposes indicated, that is to say, either a cultivator of the share type, sweep, or harrow—adapting itself for many uses in ground working.

Another object of the invention is the provision of an implement or machine of this character wherein the ground working tools or implements are susceptible of adjustability according to the requirements in the use of the implement or machine and also for assuring the proper working of the ground and for the destruction of weeds or the like.

A further object of the invention is the provision of an implement or machine of this character which is simple in its construction, thoroughly reliable and efficient in operation, readily and easily converted for one character of ground working to another with dispatch, convenient for adjustment and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:

Figure 1 is a plan view partly in section of an implement or machine constructed in accordance with the invention being converted into a spring toothed harrow.

Figure 2 is a fragmentary top plan view showing the implement or machine useable as a shovel cultivator.

Figure 3 is a side view of the structure shown in Figure 2.

Similar reference characters indicate corresponding parts throughout the several views in the drawing.

Referring to the drawing in detail, particularly Figure 1, the implement or machine comprises a drag bar 5 formed from a pair of spaced parallel strap irons 6, these being uniformly spaced from each other by spacer blocks 7 and sleeves 8 respectively, which are bolted as at 9 to the said irons. Carried by and extending rearwardly from the drag bar 5 are the intermediate and outer tubular bearing hangers 10 and 11, respectively, in which are pivoted at 12 intermediate and outer substantially U-shaped drag frames 13 and 14, respectively. The intermediate frame 13 has its side limbs for a distance thereof arranged in rearward convergent relation to each other as at 15 with the rearmost end portions straight at 16 and between which latter is bolted a drag extension 17, the bolts being indicated at 18. Each outer frame 14 has a straight side 19 and an annular side with respect to the said side 19, as at 20, so that the terminals of these sides approach each other and have fitted therebetween or bolted thereto a drag extension 21, the bolts being indicated at 22. The drag frames 13 and 14 are susceptible of vertical swing on the pivots 12.

On the intermediate frame 13 and the outer frames 14 are laterally extending supplemental frames 23 and 24, respectively, the latter being common to the said frames 14 and are outermost thereto being bolted at 25 while the frames 23 are outermost to the frame 13 and at opposite sides thereof being bolted at 26 so that these frames 14 and 15 are increased in the lateral spread of the same.

Bolted or otherwise carried by the frames 13 and 14 at the sides thereof next to the uppermost ends of the same are stationary hubs 27, these being similar to each other and accommodate hangers 28 provided with clamps 29 for stems 30 of curved spring harrow teeth 31. The supplemental frames 23 and 24 are provided as well as the extensions 17 and 21 with curved spring harrow teeth 31 which are attached to the said frames in a similar manner to the attachment of the teeth 31 on the frames 13 and 14, excepting that those harrow teeth 31 attached to the extensions 17 and 21 are clamped thereto, as at 32, the extensions 17 and 21 having the attaching means 32 provided with notches 33 for accommodating the stems 34 of the harrows 31 for mounting therewith. The extensions 17 and 21 at the rearmost ends thereof have the clamps 35 so that harrow teeth can be attached thereto at this point, one of the harrows 31 being attached to the clamp 35 on the extension 17.

Now in Figures 2 and 3 of the drawing there is shown a conversion of the implement or machine from a toothed harrow to a cultivator of the shovel type and therein one of the outer frames of the implement or machine being identified at 36 and the stems 37 of the shovels 38 are clamped thereto as at 39 and 40 respectively so that the implement or machine can be utilized as a field cultivator or sweep.

The drag bar 5 of the implement or machine can be hitched to a tractor, not shown, in any required manner for the advancement of said implement or machine, yet it may be otherwise drawn or advanced for the service of the same either as a cultivator or toothed harrow.

The harrow teeth 31 by reason of the mounting of the stems 30 of the same and the clamps 29 for said stems including the hangers 28 enable variable adjustment, this being also true with regard to the shovels 38 having the stems 37.

In the arrangement of the drag frame the implement or machine has a maximum spread transversely to the line of direction thereof and the teeth 31 by reason of the mounting thereof can be arranged in staggered relation to each other, as well as uniformly spaced one from the other, for the working of the soil of a row crop.

What is claimed is:

An implement of the character described comprising a drag bar having rearwardly directed bearings at determined spaced relation to each other, rearwardly tapered open frames pivoted in said bearings for vertical swinging movements, lateral extensions forming supplemental frames carried by the first-named frames, clamps associated with said frames, ground working tool holders associated with the clamps for adjustment laterally and vertically, and ground working tools held by said holders and at all times maintained in echelon relation throughout the same.

WILBUR JAY SWEET.
ARTHUR D. BRUCE.